United States Patent [19]

Vancraeynest

[11] Patent Number: 5,063,571

[45] Date of Patent: Nov. 5, 1991

[54] METHOD AND APPARATUS FOR INCREASING THE DATA RATE FOR A GIVEN SYMBOL RATE IN A SPREAD SPECTRUM SYSTEM

[75] Inventor: Jan P. Vancraeynest, White Plains, N.Y.

[73] Assignee: NYNEX Corporation, White Plains, N.Y.

[21] Appl. No.: 457,276

[22] Filed: Dec. 27, 1989

[51] Int. Cl.$^5$ .............................................. H04L 27/30
[52] U.S. Cl. ........................................ 375/1; 380/34; 380/49
[58] Field of Search ................ 375/1; 380/21, 33, 48, 380/34, 46, 49

[56] References Cited

U.S. PATENT DOCUMENTS

| Re. 32,905 | 4/1989 | Baran | 370/104.1 |
| 4,071,903 | 1/1978 | Head et al. | 364/728.04 |
| 4,203,071 | 5/1980 | Bowles et al. | 375/1 |
| 4,392,232 | 7/1983 | Andren et al. | 375/86 |
| 4,455,651 | 6/1984 | Baran | 370/95.3 |
| 4,759,034 | 7/1988 | Nagazumi | 375/1 |
| 4,817,001 | 3/1989 | Lundquist et al. | 364/460 |
| 4,912,722 | 3/1990 | Carlin | 375/1 |

Primary Examiner—Bernarr E. Gregory
Attorney, Agent, or Firm—Loren C. Swingle; Kenneth Rubenstein

[57] ABSTRACT

A method and apparatus for transmitting a stream of data bits in a spread spectrum format is disclosed. The inventive method comprises providing $2^N$ predetermined spreading sequences, where N is equal to or larger than 2. The predetermined spreading sequences have suitable autocorrelation and cross-correlation properties. For each group of N bits in a stream of data bits to be transmitted, a particular one from the $2^N$ predetermined spreading sequences is selected and transmitted. In this manner, each transmitted spreading sequence corresponds to a particular arrangement of N bits. The invention achieves an N-fold increase in data rate for a particular symbol rate by encoding N bits in a spreading sequence.

20 Claims, 2 Drawing Sheets

METHOD AND APPARATUS FOR INCREASING THE DATA RATE FOR A GIVEN SYMBOL RATE IN A SPREAD SPECTRUM SYSTEM

FIELD OF THE INVENTION

The present invention relates to a spread spectrum communications technique. More particularly, the present invention relates to an encoding technique for use in spread spectrum communications wherein an N-fold increase in data rate for a given symbol rate is achieved by encoding N data bits for each spreading sequence.

BACKGROUND OF THE INVENTION

Spread spectrum techniques permit data signals to be extracted from noise with a relatively small error rate. In a spread spectrum system, a binary 1 data bit is represented by a first sequence of binary states or elements called chips, and a binary 0 data bit is represented by a second sequence of binary chips. Each sequence of binary chips is known as a spreading sequence. Typically, the second sequence of chips is the complement of the first sequence chips. Thus, in a spread spectrum coding technique, the basic unit of data, i.e. the data bit, is encoded by forming a sequence of chips. The chip rate is much higher than the data rate and each chip has a much broader frequency spectrum than a data bit. Since each chip has a frequency spectrum that is spread much wider than the frequency spectrum of the original data bit, the technique is known as spread spectrum.

At a receiver, a stream of data bits, which has been transmitted using the spread spectrum format, is recovered using a process known as despreading. Despreading involves correlating the received signal which comprises chips, with a local reference chip sequence. The local reference utilizes the same chip sequence that was used to encode the data bits at the transmitting end. More particularly, at the receiver, the reference chip sequence is stored in a register. The signal comprising the received chips is entered into a shift register, and for each chip time period, the received chips are advanced one position in the shift register. At each chip time period, the number of matches between the prestored reference sequence and the received chips in the shift register is obtained. Consider the case where the reference sequence corresponds to a binary 1 data bit and the binary 0 data bit is represented by the complement of the reference sequence. In this case, when the number of matches exceeds a predetermined upper threshold, a data decision is made indicating the presence of a binary 1 data bit. When the number of matches falls below a predetermined lower threshold, a data decision is made indicating the presence of a binary 0 data bit. In between the data decisions times, when there are portions of two consecutive spreading sequences in the shift register (i.e. the end portion of one sequence and the beginning of the next sequence), the number of matches falls in between the high and low thresholds, thus preventing erroneous data decisions.

In a noise free system, the presence of a binary 1 will be indicated by a total match between the received chips in the shift register and the reference sequence. Similarly, the presence of a binary 0 will be indicated by no matches between the received chips in the shift register and the reference sequence. However, in real systems, noise prevents all the chips in a spreading sequence from being correctly received so that binary 1 and binary 0 data decisions are based on whether the number of matches is above or below upper and lower predetermined thresholds, respectively. This process has the effect of averaging out random noise. Thus, the despread signal component is enhanced and the noise component is reduced. This is known in the spread spectrum art as process gain and is defined as the number of chips per data bit.

In short, in a spread spectrum communication system, at an encoder or spreader, each data bit in a data bit stream is coded by transmitting a sequence of binary chips. Typically, one such spreading sequence is used to represent a binary "1" and its complement is used to represent a binary "0". The chips representing the data bit stream are modulated onto a carrier using a conventional two-level modulation technique such as binary phase shift keying (BPSK) or frequency shift keying (FSK), and transmitted to a decoder or despreader. At the decoder or despreader, the chips are demodulated and correlated with a reference sequence to reconstruct the original data bit stream.

In a spread spectrum system, the symbol rate is the rate at which sequences of chips are transmitted and the data rate is the rate at which data is transmitted. For a given symbol rate, it is desirable for the data rate to be as high as possible.

Outside of the spread spectrum art, it is well known that encoding multiple bits per symbol increases the data transmission rate for a given symbol transmission rate, provided that the symbols can be received with a sufficiently low error rate. In the prior art, the encoding of multiple bits per symbol is typically accomplished by various multiple level modulation schemes such as quadriphase shift keying (QPSK) or quadrature amplitude modulation (e.g. 64QAM). These multilevel modulation techniques utilize combinations of changes in phase and/or amplitude to provide multiple (i.e. more than two) modulation levels. Thus, each transmitted modulated symbol can represent more than one bit. The disadvantage of these multilevel modulation schemes is that there is an increase in symbol error rate for a given signal-to-noise ratio as the modulation scheme contains more levels.

In view of the foregoing it is an object of the present invention to improve the spread spectrum communication technique by increasing the data rate for a given symbol rate.

It is a further object of the present invention to improve the spread spectrum communication technique by increasing the data rate for a given symbol rate by encoding multiple bits with each spreading sequence.

It is also an object of the present invention to improve the spread spectrum communication technique by increasing the data rate for a given symbol rate without the use of a multilevel modulation technique.

SUMMARY OF THE INVENTION

The present invention is an improvement in the spread spectrum communication technique which increases the data rate N-fold for a given symbol rate. This is accomplished by encoding N ($N \geq 2$) bits for each transmitted spreading sequence.

More particularly, to encode a stream of data bits, $2^N$ predetermined spreading sequences are provided. The data bit stream is divided into groups of N bits, and for each N bit group, a corresponding one of the $2^N$ predetermined spreading sequence is selected and transmitted.

Illustratively, the chips comprising a selected spreading sequence serve as a source for a simple two-level modulation scheme such as frequency shift keying (FSK) or binary phase shift keying (BPSK).

To receive a signal transmitted in the multiple bit per spreading sequence format, the spreading sequences are demodulated and correlated with the $2^N$ predetermined spreading sequences to identify which of the $2^N$ predetermined spreading sequences have been received. The identified spreading sequences are then decoded to regenerate the original groups of N data bits.

DETAILED DESCRIPTION OF THE INVENTION

Before describing the N-bit spread spectrum encoding technique of the present invention, it may be helpful to briefly review the conventional single bit spread spectrum technique.

In accordance with the conventional spread spectrum encoding technique, each data bit in a data bit stream is mapped into a sequence of chips known as a spreading sequence. Consider the following example:

binary 1→(first)110110010100001(last)

binary 0→(first)001001101011110(last)

wherein the spreading sequence for binary 0 is the complement of the spreading sequence for binary 1 and wherein (first) and (last) indicate the order in which the chips are transmitted. Each chip has a much wider frequency spectrum than a data bit. The spreading sequence corresponding to each bit in the data bit stream is modulated onto a carrier, preferably using a simple two-level modulation scheme such as BPSK or FSK and transmitted to a remote receiver. At a receiver, the received spreading sequences are correlated with a reference sequence to convert the spreading sequences back into data bits.

Figure 1A:
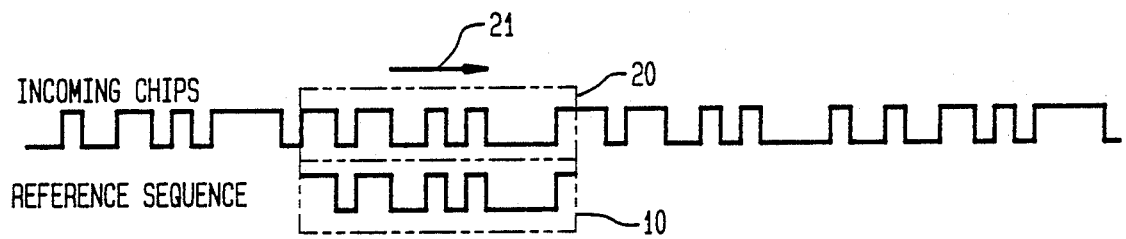
FIGS. 1A and 1B illustrate the conventional spread spectrum technique.

FIG. 1A shows a reference sequence which is the same as the spreading sequence for binary 1 identified above. Illustratively, the reference sequence is stored in a register 10 which is schematically illustrated in FIG. 1A. FIG. 1A also shows the incoming chips. The incoming chips are entered into a shift register 20 schematically illustrated in FIG. 1A. The incoming chips are shifted one position in the shift register (i.e. in the direction of arrow 21) at the end of each chip time period.

The incoming chips are correlated with the reference sequence. More particularly, at each chip time period, the chip values stored in the shift register are compared with the reference sequence and the number of matches is counted. The number of matches is plotted as a function of time in FIG. 1B. Note that the plot of FIG. 1B has a high threshold and a low threshold. In any chip time period, when the number of matches exceeds the high threshold, a data decision is made indicating the presence of a binary 1 data bit. Similarly, when the number of matches falls below the low threshold, a data decision is made indicating the presence of a binary 0 bit. In the absence of noise, a binary 1 bit would be indicated by a complete match between the reference sequence and the received chips in the shift register. Similarly, binary 0 would be indicated by a complete mismatch between the reference sequence and the received chips in the shift register because a binary 0 is encoded with the complement of the reference sequence. However, because in a noisy environment there is a certain chip error rate, a detection decision indicating a binary 1 or binary 0 is made when the number of matches exceeds or falls below high and low thresholds, respectively. As indicated previously, this correlation process has the effect of averaging out random noise so that the signal component is enhanced and the noise reduced.

Figure 1B:
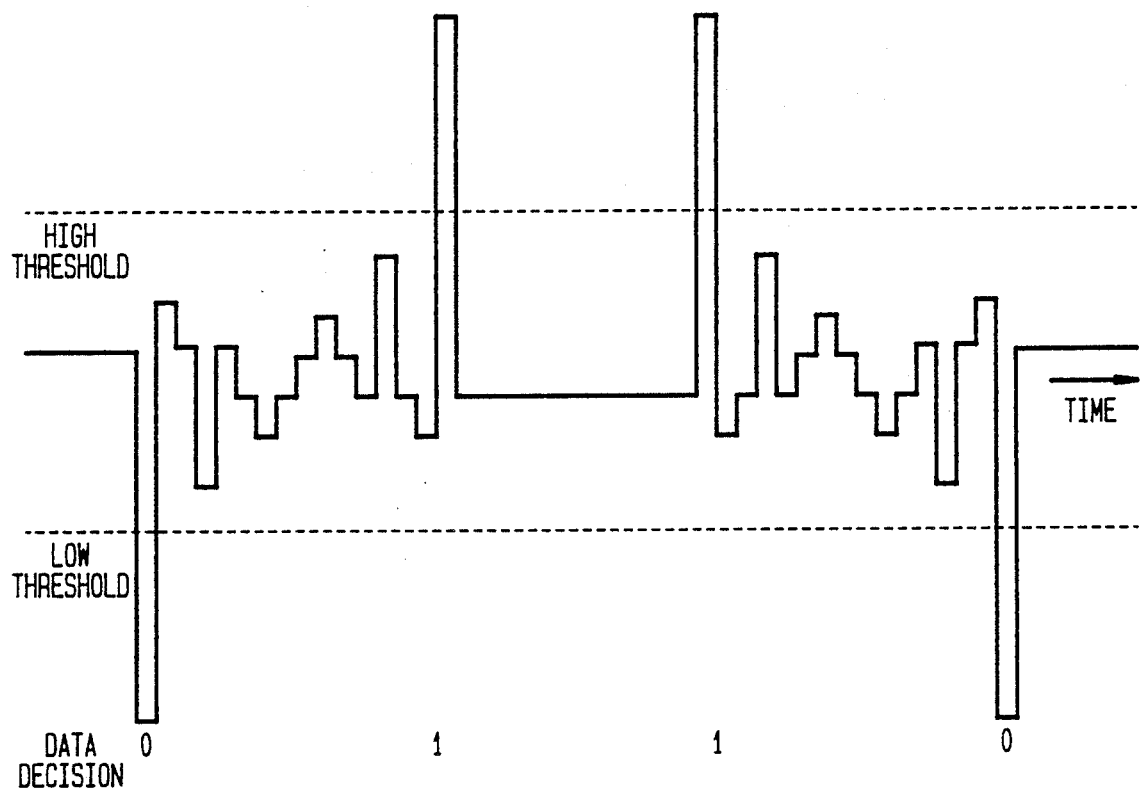

In connection with FIG. 1B, it should be noted that at times when a complete received spreading sequence is not being compared with the reference sequence (i.e. between data decision times), the number of matches falls in between the high and low threshold. Only at decision times do the number of matches fall outside the thresholds. Another way of saying this is that the spreading sequences utilized to code the binary 1 and binary 0 data bits have a single autocorrelation peak, low autocorrelation sidelobes and low cross and partial correlations. Since the binary 1 and binary 0 spreading sequences are complements of each other, the cross-correlation function is small.

While the above-described spread spectrum technique serves to reduce the error rate for a transmitted bit stream, it would be desirable to increase the data rate for a given symbol rate. As indicated above, the present invention achieves an N-fold increase in data bit rate for a given symbol rate by coding N bits for each spreading sequence. Consider an example wherein the data rate is doubled for a given symbol rate. This is accomplished by coding two data bits per spreading sequence. This requires four different chip sequences denoted by A, B, $\bar{A}$, $\bar{B}$, where $\bar{A}$ and $\bar{B}$ denote the complements of A and B, respectively.

Preferably, in order to be distinguishable at the despreader, the sequences A, B, $\bar{A}$, $\bar{B}$ have the following properties.

1. single autocorrelation peak
2. low autocorrelation sidelobes
3. low cross and partial correlations (By a partial correlation, it is meant that when a portion of one sequence and a portion of another sequence is compared with one of the sequences, the number of matches falls in between a high and a low threshold.)

For practical purposes, the sequences A, B, $\bar{A}$, $\bar{B}$, should be nearly balanced, i.e., they should have almost as many binary 1's as binary 0's, to avoid D.C. offsets.

These sequences can be found by a search of all possible combinations of sequences of a given length L and selecting the sequence combinations that satisfy the above requirements. If the sequence of length 2L obtained by concatenating the sequences A and B of length L is denoted by AB and "*" denotes correlation, then the requirements identified above become, for the sequences A, B, $\bar{A}$, $\bar{B}$, the following:

1. AA*A, BB*B, $\bar{AA}$* A, $\bar{BB}$*B have a single autocorrelation peak.
2. AA*B, BB*A, $\bar{AA}$*B, $\bar{BB}$*A have low cross-correlations.

3. A$\underline{A}$* A, B$\underline{B}$*B have low cross-correlation.
4. A$\underline{A}$*B, B$\underline{B}$*A have low cross-correlations.
5. A$\overline{B}$*A, A$\overline{B}$*B, A$\underline{B}$*A, A$\underline{B}$*B, BA*A, BA*B, B$\underline{B}$*A, BA*B have low cross-correlations.

How far the autocorrelation sidelobes and the cross and partial correlations are below the peak autocorrelation values will determine how many chips can be received in error. It is desirable that the autocorrelation sidelobes and the partial and cross correlations be as far away from the high and low thresholds as possible.

An example of a possible chip sequence to be used for encoding 2 bits per chip sequence when L=12 is as follows:

```
A = (first)000011110101(last)
B = (first)001100110101(last)
A = (first)111100001010(last)
B = (first)110011001010(last)
```

For these sequences, peak correlations are 0 and 12 matches. Autocorrelation sidelobes and cross and partial correlation values are at most 8 and 4 matches, so the high threshold can be set $\geq 9$ and the low threshold can be set $\leq 3$, with thresholds at 10 and 2 providing the best performance for a given chip error rate.

The mapping from N-bit groups (e.g. N=2) to sequences should be done such that the bit groups with the largest Hamming distance are mapped into sequences with the largest Hamming distance. For the illustrative sequences A, B, $\underline{A}$, $\underline{B}$ provided above, a feasible mapping is as follows:

| bit group | Sequence |
|---|---|
| 00 | A |
| 01 | B |
| 10 | $\underline{B}$ |
| 11 | $\underline{A}$ |

To illustrate how special the sequences A, B, $\underline{A}$, $\underline{B}$ are, consider that out of 16,777,216 possible sequence combinations of length L=12 chips, only four combinations satisfy the requirements stated above at the optimum side lobe level of 4 below peak correlation. These other combinations are:

```
A = (first)010100001111(last)
B = 010100110011
A = 101011001100
B = 101011110000
A = 010100110011
B = 101011110000
```

To achieve a 3-fold increase in data rate, four sequences A, B, C, D and their complements $\underline{A}$, $\underline{B}$, $\underline{C}$, $\underline{D}$ are needed to encode the eight possible combinations of three bits.

For optimal cross-correlations at length L=16, illustrative sequences are:

```
A = (first) 0000001000110101 (last)
B = 0000001111000101
C = 0011000011011010
D = 0011001101101010
A = 0000001110011001
B = 0000011011101010
C = 0000100101101010
D = 0000111001011001
```

Autocorrelation sidelobes and cross and partial correlations are at most 5 and 11 matches.

Figure 2:
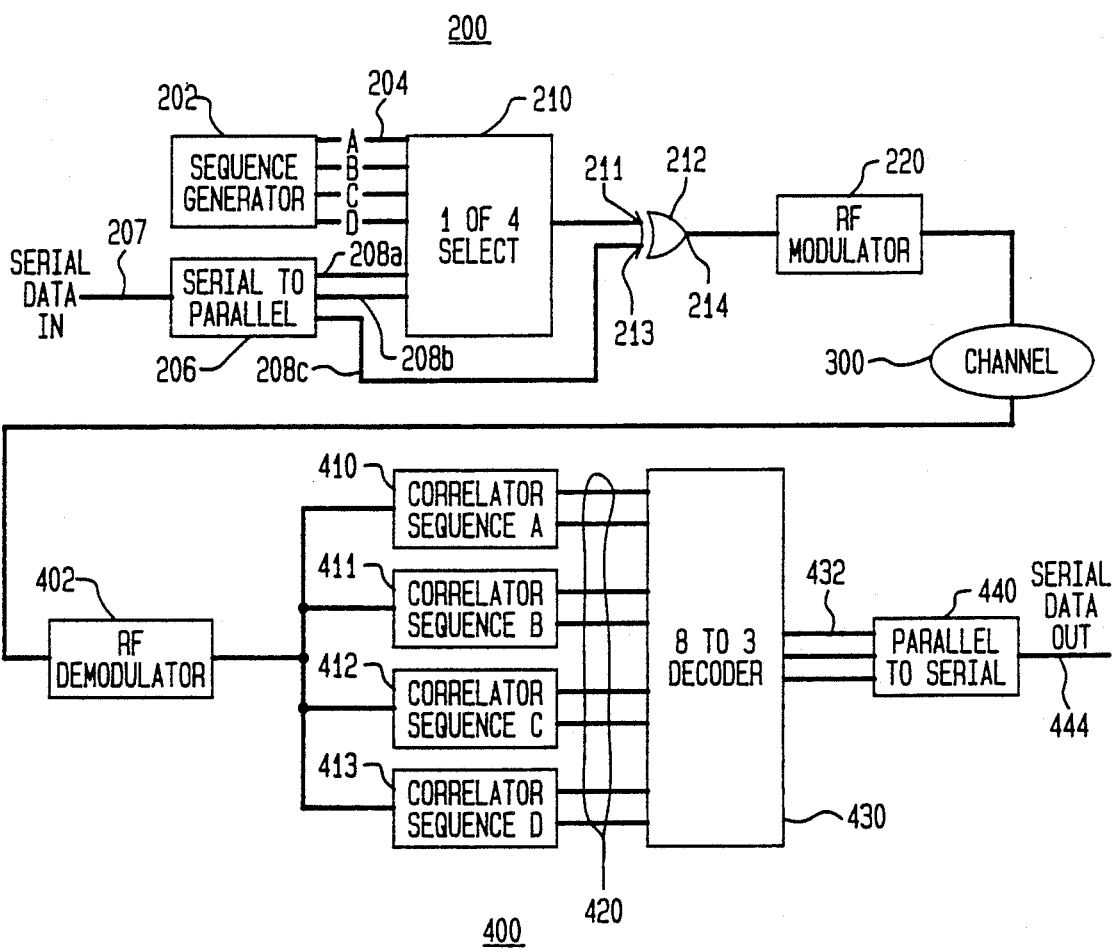
FIG. 2 illustrates a spreader for encoding N bits per spreading sequence, in accordance with an illustrative embodiment of the present invention, and a despreader for decoding N bits per spreading sequence, in accordance with an illustrative embodiment of the present invention.

FIG. 2 schematically illustrates a spreader 200 for encoding N bits per spreading sequence and a despreader 400 for receiving the spread spectrum signal produced by the spreader 200. The spreader 200 and despreader 400 are connected by the communications channel 300. In the illustrative spreader and despreader of FIG. 2, N=3 so that three bits are encoded per spreading sequence.

The spreader 200 comprises a sequence generator 202 which can generate $2^{N-1}=4$ predetermined spreading sequences A, B, C, and D on lines 204. The sequence generator 202 may comprise a memory for storing the $2^{N-1}$ sequences or other circuitry for generating the sequences. The spreader 200 also includes a serial-to-parallel converter 206 for receiving on line 207 the data bit stream to be encoded. The serial-to-parallel converter 206 outputs groups of N=3 bits in parallel on lines 208a, 208b, 208c. Two of the bits on lines 208a, 208b are transmitted to the selector 210 so that the selector 210 can select one of the four sequences A, B, C or D. The selected sequence is then transmitted to an input 211 of an EXCLUSIVE-OR gate 212. The third bit of the N=3 bits produced by the serial-to-parallel converter 206 is transmitted via line 208c to a second input 213 of the EXCLUSIVE-OR gate 212. When the bit on line 208c is a binary 1, the complement of the selected sequence is produced at the output 214 of the gate 212. The sequence at the output of the gate 212 is modulated by the RF modulator 220 and transmitted via the channel 300 to the despreader 400.

At the despreader 400 the received spread spectrum signal is demodulated by the demodulator 402 and transmitted in parallel to the four correlators 410, 411, 412, 413. The correlators 410, 411, 412, 413 have as their reference sequences, the sequences A, B, C, and D respectively. Thus, the correlators 410, 411, 412, 413 determine if the received spreading sequences include the sequences A or $\underline{A}$, B or $\underline{B}$, C or $\underline{C}$, D or $\underline{D}$, respectively. Each of the correlators has two output lines 420, for indicating the presence of a particular sequence or its complement or equivalently to indicate if the low or high threshold has been exceeded. The decoder 430 receives an output from any of the $2^N=8$ correlator output lines 420 and converts this output into a corresponding N=3 bit group in parallel on lines 432. The parallel N 3 bit group on lines 432 is converted into serial form on line 444 by parallel-to serial converter 440.

If, for example, in a communication system, a correlator output is used to indicate link activity, the presence of $2^{N-1}$ rather than 1 correlator will increase the probability of falsely indicating a valid chip sequence when random noise is input to the despreader. This can be remedied by qualifying a "sequence present" signal from a correlator with another signal indicative of link activity such as received RF level.

In short, a method and apparatus for transmitting a stream of data bits in a spread spectrum format is disclosed. The inventive method comprises providing $2^N$ predetermined spreading sequences, where N is equal to or larger than two. The predetermined spreading sequences have suitable auto, cross, and partial correlation properties. For each group of N bits in a stream of data bits to be transmitted, a particular one from the $2^N$ predetermined spreading sequences is selected and transmitted. In this manner, each transmitted spreading sequence corresponds to a particular arrangement of N bits. The invention achieves an N-fold increase in data rate for a particular symbol rate by encoding N bits in a spreading sequence.

Finally, the above-described embodiments of the invention are intended to be illustrative only. Numerous alternative embodiments may be devised by those skilled in the art without departing from the spirit or scope of the following claims.

I claim:

1. A method for transmitting a stream of data bits in a spread spectrum format comprising the steps of
   providing $2^N$ predetermined spreading sequences, where N is equal to or greater than two, and
   spreading groups of N bits in said stream of data bits in accordance with specific ones of said spreading sequences, each of said specific ones of said spreading sequences being chosen as a function of the bit values in one of said groups of N bits, and
   transmitting said data bits as spread by said spreading sequences.

2. The method of claim 1 wherein said $2^N$ spreading sequences comprises $2^{N-1}$ distinct spreading sequences and their complements.

3. The method of claim 1 wherein said spreading sequences having single auto correlation peaks and low autocorrelation sidelobes.

4. The method of claim 3 wherein said spreading sequences have cross-correlations and partial correlations in between a predetermined high threshold and a predetermined low threshold.

5. A method for transmitting a stream of data bits in spread spectrum format comprising spreading groups of N bits from said stream of data bits, where N is equal to or greater than two, in accordance with a specific single spreading sequence chosen from a group of $2^N$ predetermined spreading sequences as a function of the bit values in each of said groups of N bits, and transmitting said bits in said groups as spread by said spreading sequences.

6. The method of claim 5 wherein said group of $2^N$ spreading sequences comprises $2^{N-1}$ distinct spreading sequences and their complements.

7. The method of claim 5 wherein said transmitting step comprises modulating said data bits as spread by said spreading sequences onto a carrier for transmission to a remote location using a modulation scheme with two modulation levels.

8. A coding circuit for coding a stream of data bits in a spread spectrum format comprising,
   selection means for simultaneously receiving a plurality of data bits from said data bit stream and for selecting a particular spreading sequence out of a plurality of predetermined spreading sequences as a function of the bit values in said plurality of data bits, and
   transmitting means for transmitting said plurality of data bits as spread by said particular spreading sequence to a remote location.

9. The coding circuit of claim 8 wherein said plurality of data bits comprises N bits and said plurality of predetermined spreading sequences comprises $2^N$ spreading sequences.

10. The circuit of claim 9 wherein said selection means comprises a generator circuit capable of generating $2^{N-1}$ predetermined spreading sequences, a selector circuit for selecting one of said $2^{N-1}$ spreading sequences as a function of the bit values of said plurality of data bits, and complement means for selectively providing a complement of the selected spreading sequence depending on the bit value of said plurality of bits.

11. The coding circuit of claim 9 wherein said transmitting means comprises modulation means for modulating said plurality of bits as spread by said particular spreading sequence onto a carrier using a two level modulation scheme.

12. The coding circuit of claim 9 wherein said predetermined spreading sequences have single autocorrelation peaks, and autocorrelation sidelobes, cross-correlations and partial correlations in between predetermined high and low thresholds.

13. A decoding circuit for decoding a signal in a spread spectrum format comprising
    means for receiving said signal in said spread spectrum format,
    a plurality of correlator circuits for correlating said received spread spectrum signal with a plurality of predetermined spreading sequences to identify particular ones of said predetermined spreading sequences contained in said received spread spectrum signal, and
    decoder means for converting each of said identified spreading sequences contained in said received spread spectrum signal into a particular plurality of data bits as a function of the identified spreading sequence.

14. The decoder circuit of claim 13 wherein said plurality of correlator circuits are arranged in parallel for correlating said received spread spectrum signal with said plurality of predetermined spreading sequences in parallel.

15. The decoder circuit of claim 13 wherein said plurality of data bits comprises N bits, wherein said plurality of predetermined spreading sequences comprises $2^{N-1}$ distinct spreading sequences and complements of the $2^{N-1}$ distinct spreading sequences, and wherein each of said correlators correlates the received spread spectrum signal with one of said $2^{N-1}$ distinct spreading sequences and a complement.

16. The circuit of claim 13 wherein said predetermined spreading sequences have a single autocorrelation peak, and autocorrelation sidelobes and cross and partial correlations in between predetermined low and high thresholds.

17. The circuit of claim 13 wherein said receiving means includes demodulation means for demodulating said received signal in said spread spectrum format from a carrier.

18. A method for decoding a signal in spread spectrum format comprising the steps of:
    receiving said signal in said spread spectrum format,
    correlating said received spread spectrum signal with a plurality of predetermined spreading sequences to produce an identifying signal for identifying particular ones of said predetermined spreading sequences contained in said received spread spectrum signal,
    and converting each of said identified spreading sequences contained in said received spread spectrum signal into a plurality of N, $N \geq 2$, data bits as a function of the particular identified spreading sequence.

19. The method of claim 18, wherein said identifying signal is utilized to indicate link activity in a communication system.

20. The method of claim 18 wherein said identifying signal is qualified with a signal indicative of link activity in a communication system.

* * * * *